May 14, 1929.  F. J. LAHER  1,712,706
AUTOMOBILE BUMPER
Filed Jan. 3, 1928
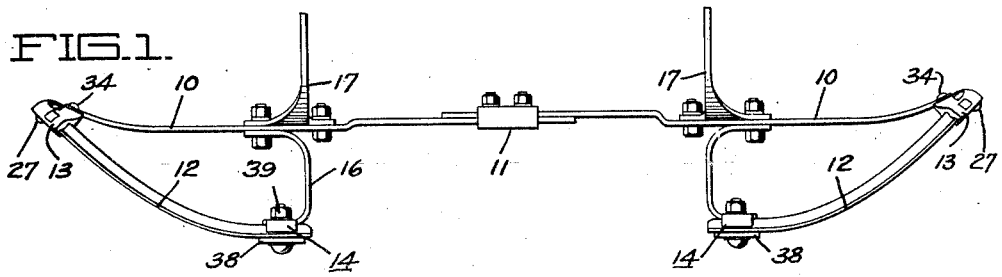
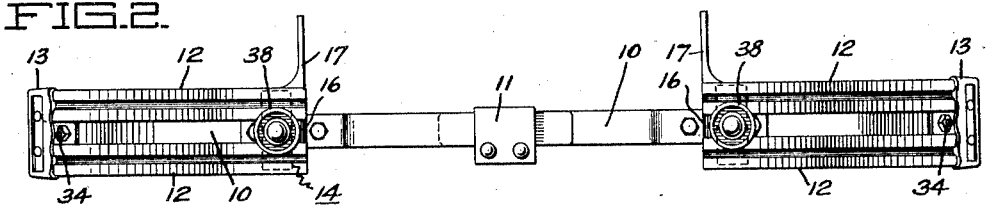
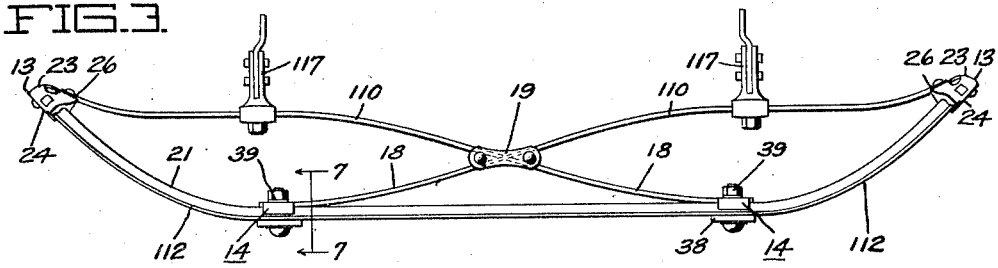
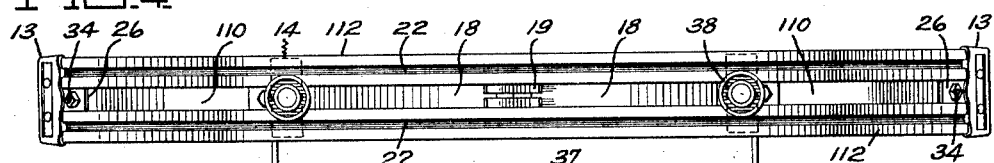
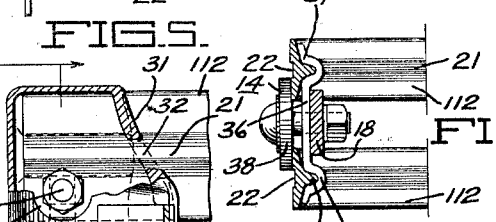
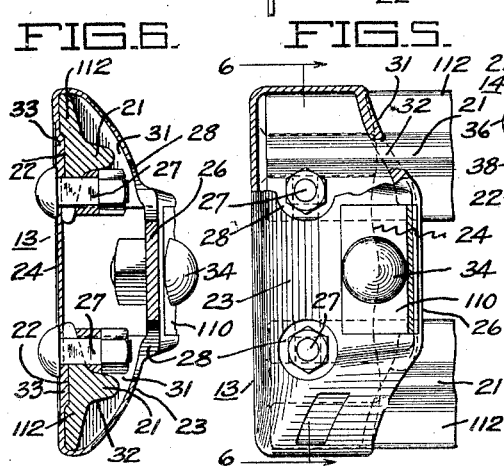
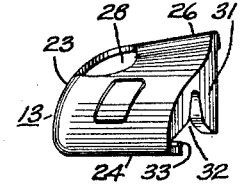
INVENTOR:
Frank J. Laher
BY
White, Prost & Fryer
ATTORNEYS.

Patented May 14, 1929.

1,712,706

UNITED STATES PATENT OFFICE.

FRANK J. LAHER, OF OAKLAND, CALIFORNIA.

AUTOMOBILE BUMPER.

Application filed January 3, 1928. Serial No. 244,173.

This invention relates generally to bumpers or fenders for protecting automobiles or other motor vehicles from accidental impacts.

It is an object of this invention to devise an automobile bumper which will be effective to absorb the force of impacts and which may be cheaply and readily manufactured.

It is a further object of this invention to devise a bumper of the spring bar type which will obviate the necessity of forming loops in the ends of the impact bars.

It is a further object of this invention to devise a bumper having improved means for securing together the ends of the impact bars.

It is a further object of this invention to devise an improved form of impact bar which need not be hardened or heat treated in any way during manufacture of the bumper.

Further objects of the invention will appear from the following description in which I have set forth the preferred embodiment of my invention. It is to be understood that the appended claims are to be accorded a range of equivalents consistent with the state of the prior art.

Referring to the drawing:

Figure 1 is a plan view of a bumper of the wing type incorporating the principles of this invention.

Fig. 2 is a rear view of the bumper as shown in Fig. 1.

Fig. 3 is a plan view of a bumper suitable for the front of an automobile.

Fig. 4 is a front view of the bumper shown in Fig. 3.

Fig. 5 is a detail view in cross section showing the manner in which the impact bars are secured to the tip members.

Fig. 6 is an enlarged cross sectional view taken along the line 6—6 of Fig. 5.

Fig. 7 is a cross sectional view taken along the line 7—7 of Fig. 3.

Fig. 8 is an end view of one of the tip members.

The bumper of my invention utilizes the usual impact and support members which are secured together and are arranged to be operably positioned upon an automobile. In case of the wing type bumper shown in Figs. 1 and 2, which is adapted for the rear of an automobile, the support members are made up of laterally extending hard steel bars 10 which may be formed as one continuous bar or may be formed in separate parts connected together as by means of a clamp 11. For receiving the force of impacts I have provided a plurality of vertically spaced impact bars 12 which are secured together at their ends by what I have termed tip members 13. In the wing type of bumper the impact bars 12 are formed in two sets, the inner ends of each set being connected together by means of a suitable spacing clamp 14, and the impact bars may be further supported by means of brace bars 16 interconnecting the clamps 14 and support bars 10. A bumper of this kind may be secured to the rear of an automobile by suitable means such as the brackets 17.

The bumper shown in Figs. 3 and 4 is similar to that of Figs. 1 and 2, with the exception that the impact bars 112 are continuous between the bumper ends. The support members 110 are shown as provided with extensions 18 which are crossed upon each other and are retained in locked relationship as by means of a suitable clamp 19. The ends of extensions 18 are secured to suitable spacing clamps 14 upon the impact bars 112. This arrangement of cross interlocking support bars has been shown and described in my Patent No. 1,615,333, granted January 25, 1927.

The impact bars of my bumper are of novel construction. In the past it has been common to utilize relatively flat bars of hard steel and in the manufacture of the bumper this hard steel was heated both in the hardening and subsequently in the tempering process. This heat treatment of an impact bar is objectionable not only because of the expense involved, but because it renders the surface of the bar of such a character that it will not readily receive a metal plating in the finishing process. To explain in greater detail, the heat treatment results in the formation of a scale or iron oxide upon the surface of the impact bars and this oxide must be carefully removed before the bar is plated with nickel or other plating metal. If a portion of this metal oxide remains, the plating will chip or blister off in a comparatively short time. The presence of this oxide is a frequent cause for the failure of the plating upon automobile bumpers.

In place of using a flat bar of spring steel, I propose to use a bumper bar formed with an integral reinforcing web upon its rear face. Thus my impact bar is of relatively light weight but the raw stock without heat treatment possesses sufficient strength to resist the impacts to which a bumper is subjected. These impact bars are formed of rolled high carbon steel formed with an integral reinforcing web, and during manufacture of the bumper the impact bars are not heat treated in any way but are merely cleaned and then passed thru the plating process. The hard steel stock as it comes from the rolling mill has its surface coated with very little metal oxide and this oxide may be readily removed before plating. The reinforcing web strengthens the impact bars to such a degree that they have practically the same or even more strength than heat treated flat impact bars of the same quality material and weight.

In practice I prefer to employ impact bars which are T-shaped in cross section so as to provide a rear reinforcing web 21, as shown in Fig. 6. The front face of the bars may be provided with a rolled-in indentation 22 to enhance the appearance of the bumper, and this indentation may be painted with a contrasting color.

The tip members which I employ are shown in detail in Figs. 5, 6 and 8. They are preferably made of metal and are of hollow construction. As shown in Fig. 8 each tip member is tapered toward its outer end and provided with a curved contour 23 to avoid hooking the bumper end upon nearby objects. The hollow construction provides a front wall 24 and a rear wall 26, and permits the tip member to receive the outer ends of the impact bars. As shown in Figs. 5 and 6, the ends of the impact bars are inserted within the tip members 13 and are clamped against the inner face of front wall 24 as by means of bolts or other suitable means 27. The rear wall 26 is preferably apertured as at 28 to permit ready insertion of a tool to tighten bolts 27. Extending from the edge of wall 26, are walls 31 which are provided with notches 32 for receiving the webs 21. Walls 31 serve as a means for interlocking with webs 21, thus preventing relative vertical displacement of the impact bars. Further interlocking with the impact bars may be secured by means of metal pads 33 which interlock with the indentations 22 of the impact bars. The support bars 10 in the case of Figs. 1 and 2, and support bars 110 indicated in Figs. 3 and 4 preferably have their ends secured to the rear walls 26 of the tip members, as by means of bolts 34.

A suitable form of clamp 14 has been shown in Fig. 7. This clamp consists merely of a metal strip 36 having its ends 37 bent U-shaped to fit about and anchor upon the webs 21 of the impact bars. Another member 38 is positioned upon the front side of the bumper, and member 38 is clamped to strip 36 as by means of bolts 39.

It is obvious that the bumper as described above may be cheaply manufactured and will be sufficiently rugged and resilient to absorb relatively heavy impacts. Because of the absence of heat treatment during manufacture, the impact bars will take a high quality of plating which will not readily chip off or deteriorate. The use of tip members for the bumper is particularly well adapted to impact bars having a reinforced web, since the ends of the bars need not then be bent to form open loops or eyes.

I claim:

1. An automobile bumper comprising a plurality of spaced impact bars, each bar having a reinforcing web upon its rear face, tip members secured to the ends of said bars, and means for retaining said bumper upon an automobile.

2. An automobile bumper comprising a plurality of vertically spaced impact bars, each bar being formed with a reinforcing web upon its rear face, tip members adapted to receive the ends of said bars, said members being formed to interlock with the webs of the bars thereby preventing vertical displacement of the bars, means for securing the impact bars to said tip members, and support means associated with said bars.

3. An automobile bumper comprising a plurality of vertically spaced impact bars, each bar being formed with a reinforcing web upon its rear face, hollow tip members adapted to receive the ends of said bars, said members being formed to interlock with the webs of the bars thereby preventing vertical displacement of the bars and also being formed to present a rounded contour for the ends of the bumper, means for securing the impact bars to said tip members, and support means associated with said bars.

4. An automobile bumper comprising a plurality of vertically spaced impact bars, hollow tip members adapted to receive the ends of said bars, means for securing said bars to the inner face of the forward wall of each tip member, each tip member having its rear wall cut away to permit access to said securing means.

5. An automobile bumper comprising a plurality of vertically spaced metal impact bars, said bars each being formed with a reinforcing web upon its inner face, a pair of tip members adapted to receive the ends of said bars, said members being hollow and formed so as to interlock with the webs of the bars so as to prevent vertical displacement of said bars, means for securing said bars to the forward walls of the tip members, support bars, and means for securing the support bars to the rear walls of said tip members.

6. An automobile bumper comprising a plurality of spaced impact bars, each bar having a reinforcing web upon its rear face, a tip member connecting corresponding ends of said bars, said tip member incorporating means for engaging said webs, and means for operably supporting the bumper upon an automobile.

7. An automobile bumper comprising a plurality of spaced impact bars, each bar having a reinforcing web upon its rear face, a tip member connecting corresponding ends of said bars, said tip member incorporating means for engaging said webs, a brace member, and means engaging said webs for connecting said brace member to said impact bars.

8. An automobile bumper comprising a plurality of spaced impact bars, each bar having a reinforcing web upon its rear face, and means for retaining said bars in vertically spaced relationship, said means including a clamp connecting said bars and engaging said web.

9. An automobile bumper comprising a plurality of spaced impact bars, each bar having a reinforcing web upon its rear face, and means for operably supporting said bars upon an automobile, said means including a brace member, and a clamp connecting said bars and connected with said brace member, said clamp incorporating means for engaging the webs of said bars.

10. An automobile bumper comprising a plurality of vertically spaced impact bars, hollow tip members adapted to receive the ends of said bars, means including a bolt extending thru the forward wall portion of each tip member for securing the same to the bars, the inner ends of each of said bolts being housed by said tips.

In testimony whereof, I have hereunto set my hand.

FRANK J. LAHER.